US012623301B2

(12) United States Patent
Woizeschke et al.

(10) Patent No.: US 12,623,301 B2
(45) Date of Patent: May 12, 2026

(54) WARM-UP TARGET FOR A LASER ENGRAVER

(71) Applicant: ASSA ABLOY AB, Stockholm (SE)

(72) Inventors: Michael Jon Woizeschke, Shakopee, MN (US); Timothy Joel Wolf, Eden Prairie, MN (US)

(73) Assignee: ASSA ABLOY AB, Stockholm (SE)

( * ) Notice: Subject to any disclaimer, the term of this patent is extended or adjusted under 35 U.S.C. 154(b) by 385 days.

(21) Appl. No.: 17/303,759

(22) Filed: Jun. 7, 2021

(65) Prior Publication Data

US 2022/0388093 A1     Dec. 8, 2022

(51) Int. Cl.
B23K 26/066       (2014.01)
B23K 26/362       (2014.01)
B23K 26/60        (2014.01)
B44C 1/22         (2006.01)

(52) U.S. Cl.
CPC .......... B23K 26/066 (2015.10); B23K 26/362 (2013.01); B23K 26/60 (2015.10); B44C 1/228 (2013.01)

(58) Field of Classification Search
CPC .... B23K 26/066; B23K 26/362; B23K 26/60; B23K 26/06; B23K 26/702; B44C 1/228; B42D 25/41; B42D 25/485; B42D 25/23
See application file for complete search history.

(56) References Cited

U.S. PATENT DOCUMENTS

| | | |
|---|---|---|
| 5,477,023 A | 12/1995 | Schneider et al. |
| 5,932,119 A | 8/1999 | Kaplan et al. |
| 6,072,585 A | 6/2000 | Dutton |
| 7,245,389 B2 | 7/2007 | Dougherty et al. |
| 8,674,258 B2 * | 3/2014 | Ellin ...................... B23K 26/40 |
| | | 219/121.69 |
| 8,941,028 B2 | 1/2015 | Burberry et al. |
| 2007/0280084 A1 | 12/2007 | Takahashi |

(Continued)

FOREIGN PATENT DOCUMENTS

| | | | |
|---|---|---|---|
| CN | 103998955 B | 6/2018 | |
| CN | 108406123 A * | 8/2018 | ........... B23K 26/032 |

(Continued)

OTHER PUBLICATIONS

"How to Align Lasers | Edmund Optics." YouTube, uploaded by Edmund Optics, May 18, 2015, https://www.youtube.com/watch?v=A1LlcQTktGU (Year: 2015).*
"European Application Serial No. 22176627.2, Extended European Search Report mailed Nov. 28, 2022", 5 pgs.

(Continued)

*Primary Examiner* — Brian W Jennison
*Assistant Examiner* — Kristina J Babinski
(74) *Attorney, Agent, or Firm* — Schwegman Lundberg & Woessner, P.A.

(57) ABSTRACT

A laser marking system comprises a laser energy source that generates a laser beam, a laser controller configured to focus the laser beam over a field of view greater than a size of laser-markable items, and a start-up target that includes laser-safe material and is located within the field of view. The laser controller is further configured to point the laser beam at the start-up target during a start-up phase of the laser energy source and focus the laser beam on one of the laser-markable items after the start-up phase.

14 Claims, 5 Drawing Sheets

500

505
GENERATING A LASER BEAM USING A LASER ENERGY SOURCE

510
POINTING THE LASER BEAM AT A LASER-SAFE START-UP TARGET IN A FIELD OF VIEW OF THE LASER ENERGY SOURCE DURING A START-UP PHASE OF THE LASER ENERGY SOURCE

515
FOCUSING THE LASER BEAM AFTER THE START-UP PHASE ON A LASER-MARKABLE CARD POSITIONED IN THE FIELD OF VIEW OF THE LASER ENERGY SOURCE

(56) References Cited

U.S. PATENT DOCUMENTS

| | | | | |
|---|---|---|---|---|
| 2009/0321398 A1* | 12/2009 | Mourou | ............... | B23K 26/066 |
| | | | | 219/121.68 |
| 2013/0154250 A1* | 6/2013 | Dunn | ..................... | B42D 25/21 |
| | | | | 283/67 |
| 2013/0296150 A1 | 11/2013 | Smirnov et al. | | |
| 2014/0087077 A1 | 3/2014 | Rowley et al. | | |
| 2019/0163417 A1 | 5/2019 | Chen et al. | | |
| 2019/0389011 A1 | 12/2019 | Miikki | | |
| 2020/0073362 A1 | 3/2020 | Shapiro et al. | | |

FOREIGN PATENT DOCUMENTS

| | | | | |
|---|---|---|---|---|
| CN | 115502564 | | 12/2022 | |
| DE | 19722762 A1 | | 12/1998 | |
| DE | 102008028705 | | 12/2009 | |
| EP | 3527319 B1 | | 7/2020 | |
| JP | 2002329320 | | 11/2002 | |
| JP | 2002334432 | | 11/2002 | |
| JP | 2008058513 A | | 3/2008 | |
| JP | 4146401 B2 | | 6/2008 | |
| JP | 3180816 B2 | | 12/2012 | |
| TW | 1248244 B | | 1/2006 | |
| WO | WO-2012013818 A1 * | 2/2012 | ............. | B23K 26/00 |
| WO | 2018033554 | | 2/2018 | |

OTHER PUBLICATIONS

"European Application Serial No. 22176627.2, Response Filed Jun. 12, 2023 to Extended European Search Report mailed Nov. 28, 2022", No Claim Amendments, 1 pg.

"Laser Engraver Quick Start and Resource Guide", Jessamine County Public Library, (May 2, 2018), 8 pgs.

"Rayjet Operation Manual", Trotec Laser GmbH, (Apr. 2020), 88 pgs.

Sinclair, Mike, "Laser Cutters: Tips and Techniques", Microsoft Research, (Jul. 17, 2019), 22 pgs.

"European Application Serial No. 22176627.2, Response Filed Jan. 19, 2024 to Rule 71(3) mailed Nov. 16, 2023", 6 pgs.

"Chinese Application Serial No. 202210634356.5, Office Action mailed Nov. 30, 2024", with English translation, 23 pages.

"Chinese Application Serial No. 202210634356.5, Office Action mailed May 27, 2025", w/ English Translation, 21 pgs.

"Chinese Application Serial No. 202210634356.5, Response filed Mar. 25, 2025 to Office Action mailed Nov. 30, 2024", W/ English Claims, 8 pgs.

"Chinese Application Serial No. 202210634356.5, Response filed Jul. 25, 2025 to Office Action mailed May 27, 2025", w/ English Claims, 11 pgs.

"Chinese Application Serial No. 202210634356.5, Decision of Rejection mailed Jan. 16, 2026", with English translation, 19 pages.

\* cited by examiner

100

104

102

106

108

110

500

505

GENERATING A LASER BEAM USING A LASER ENERGY SOURCE

510

POINTING THE LASER BEAM AT A LASER-SAFE START-UP TARGET IN A FIELD OF VIEW OF THE LASER ENERGY SOURCE DURING A START-UP PHASE OF THE LASER ENERGY SOURCE

515

FOCUSING THE LASER BEAM AFTER THE START-UP PHASE ON A LASER-MARKABLE CARD POSITIONED IN THE FIELD OF VIEW OF THE LASER ENERGY SOURCE

WARM-UP TARGET FOR A LASER ENGRAVER

TECHNICAL FIELD

Embodiments illustrated and described herein generally relate to engraving systems that use lasers.

BACKGROUND

Security cards such as identification (ID) cards can be engraved using laser marking systems to add attributes such as images or text data that makes the security cards difficult to forge or manipulate. When a laser first starts up, or has been sitting idle for a time, it can take a while to "warm up" and get the system to be consistent with its burn levels. This can be seen in engraved images as lines that have variable thickness or even missing parts of characters. For example, when lasering the character "E," the image on the card could be more of an "F" if the lasering starts at the bottom of the character. These types of errors could be even more pronounced when engraving more intricate images.

DETAILED DESCRIPTION

When a laser energy source first starts up, or has been sitting idle, it can take time to get the laser beam from the laser source to a steady state. If the laser beam is not at a steady state, images or text produced by the laser beam may not be consistent. Mechanical properties such as heat and electrical properties such as capacitance have a large impact on how a laser-engraved image will look. These issues are more prevalent at the beginning of lasering an image after a longer period of inactivity. During this start-up or warm up time there may be some issues that can show up on an engraved image. The most common issues being consistency in line thickness and consistency in gray tones. Both issues can be cause for reprints due to changes in density in the desired image over a batch of engraved cards.

Figure 1:
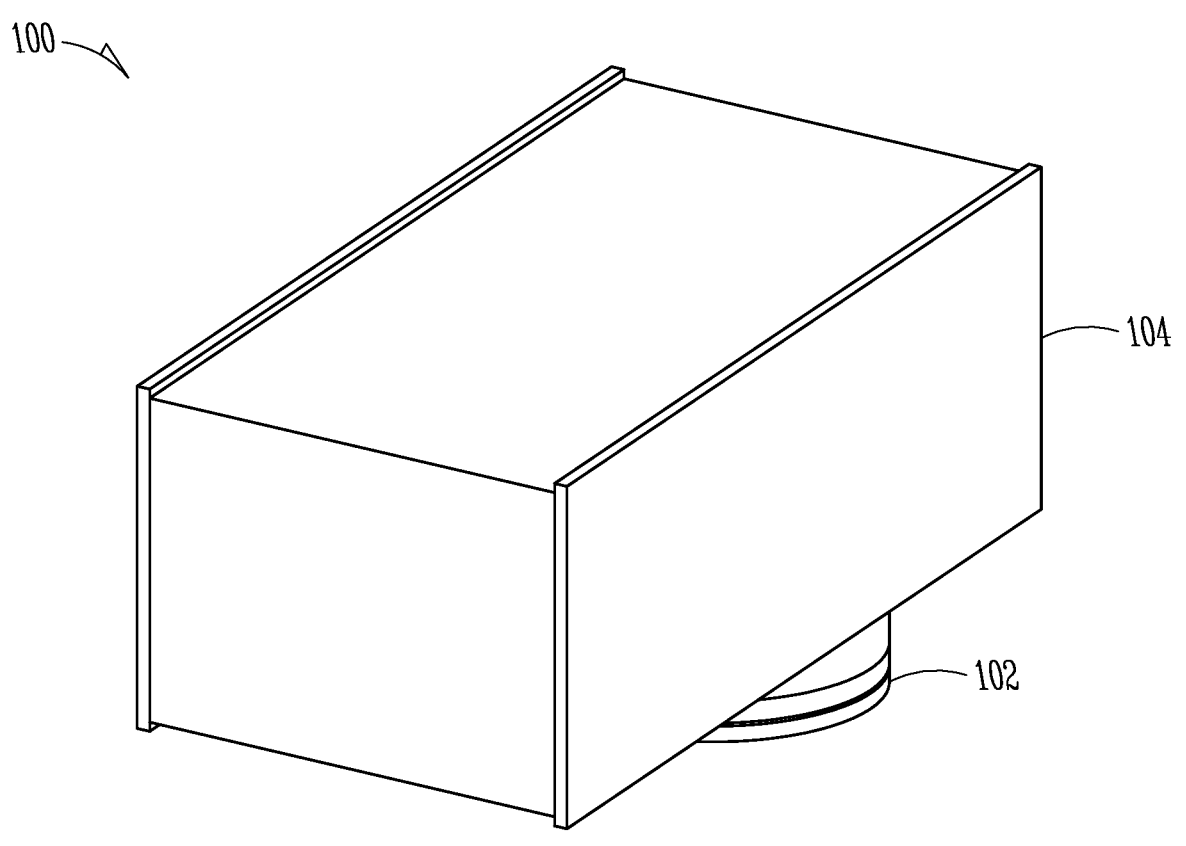
FIG. 1 is an illustration of an example of a laser marking system.
Figure 1:
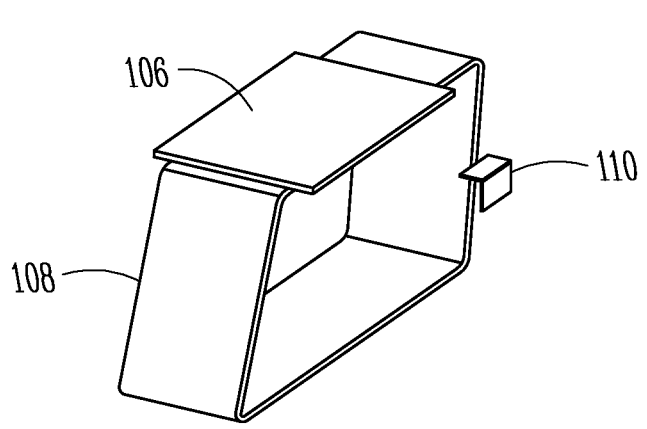

FIG. 1 is an illustration of portions of an example of a laser marking system 100. The system 100 includes a laser module having a laser controller 104 and a laser energy source. The laser energy source generates a laser beam for marking (e.g., engraving) a laser-markable item 106. A lens 102 focuses the laser beam on the laser-markable item. The laser controller 104 may include logic circuitry such as a processor (e.g., a microprocessor, field programmable gate array (FPGA), application specific integrated circuit (ASIC), or other type of processor) to manipulate one or both of the laser energy source and the lens 102. In some examples, the laser module includes a galvanometer optical scanner (galvo), and the laser controller 104 is a galvo controller.

In the example of FIG. 1, the laser-markable item is a laser-markable card made from a laser-markable material (e.g., polycarbonate, metal, etc.). For instance, the laser markable item may be an identification card meeting ISO/IEC standard 7810 ID-1 card size format. Although the laser-markable item in the example of FIG. 1 is a rectangular card, the laser-markable item can have other shapes (e.g., a circular badge), and the term "card" encompasses cards of other shapes (e.g., a square card, circular card, etc.) and sizes. The laser-markable item is not limited to cards and may be any item engravable or markable using a laser.

The system 100 also includes a transport mechanism. In the example of FIG. 1, the transport mechanism is a belt mechanism that includes belt 108. The transport mechanism moves the laser-markable item 106 to position the laser-markable item 106 in the field of view of the laser for marking. The field of view of the laser defines the maximum area engravable or markable by the laser beam. The laser controller 104 focuses the laser beam over the field of view.

The system 100 also includes a start-up target 110 made from a laser-safe material. The laser-safe material may be non-reflective. In certain examples, the start-up target 110 is metal (e.g., a sheet metal tab) with a non-reflective coating (e.g., black zinc plating or other non-reflective paint). The field of view of the laser is greater than the area of the laser-markable item 106 and the start-up target 110 is positioned within the field of view of the laser. In the example of FIG. 1, the start-up target 110 is located farther away from the laser energy source than the laser-markable item 106. Moving the start-up target closer to or farther away from the laser-markable item also moves it out of the optimal focal distance of the laser head, which reduces the energy applied to the start-up target.

Figure 2:
FIG. 2 is another illustration of the example laser marking system of FIG. 1.
Figure 2:
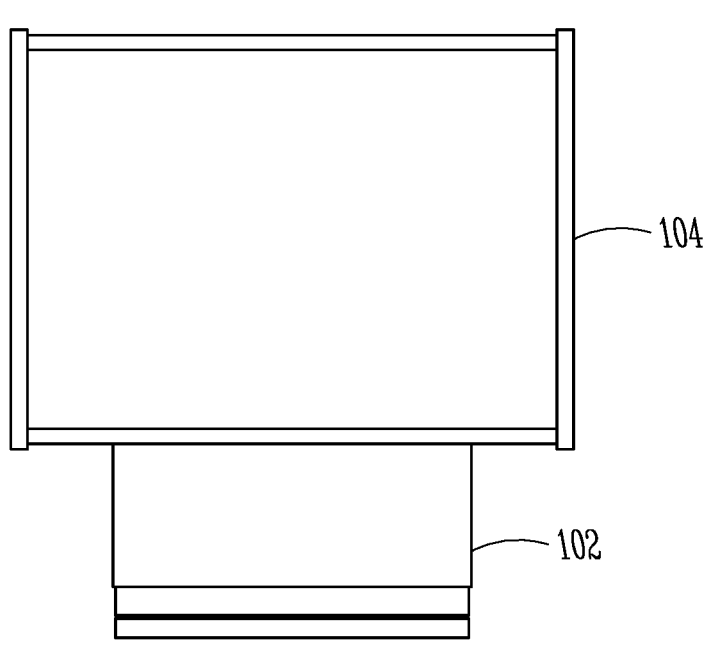
Figure 2:
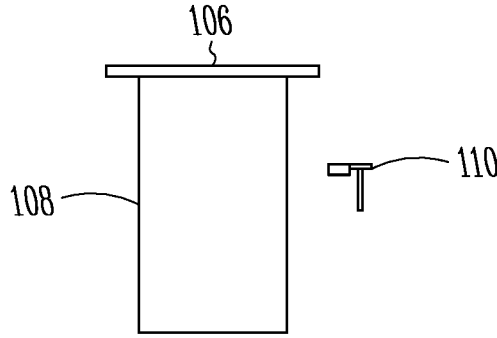

FIG. 2 is another view of the laser marking system 100 and shows the relative positions of the lens 102, laser controller 104, a laser-markable item 106, belt 108, and start-up target 110. In FIG. 2, the laser-markable item 106 is positioned in a plane, and the start-up target 110 is positioned below the plane of the laser-markable item 106. Alternatively, the start-up target 110 is positioned above the plane of the laser-markable item 106.

The laser controller 104 points the laser beam at the start-up target 110 during a start-up phase of the laser energy source and then focuses the laser beam onto the laser-markable card after the start-up phase when the laser beam is in steady state and ready to make consistent markings. During the start-up phase, the energy of the laser beam may increase from an idle or off state to the steady state. As an example, the start-up phase may be a few milliseconds needed for the laser to achieve steady state. In other examples, the energy of the laser beam may be higher than what is desired, and the energy of the laser beam decreases to the desired steady state energy during the start-up phase.

Figure 3:
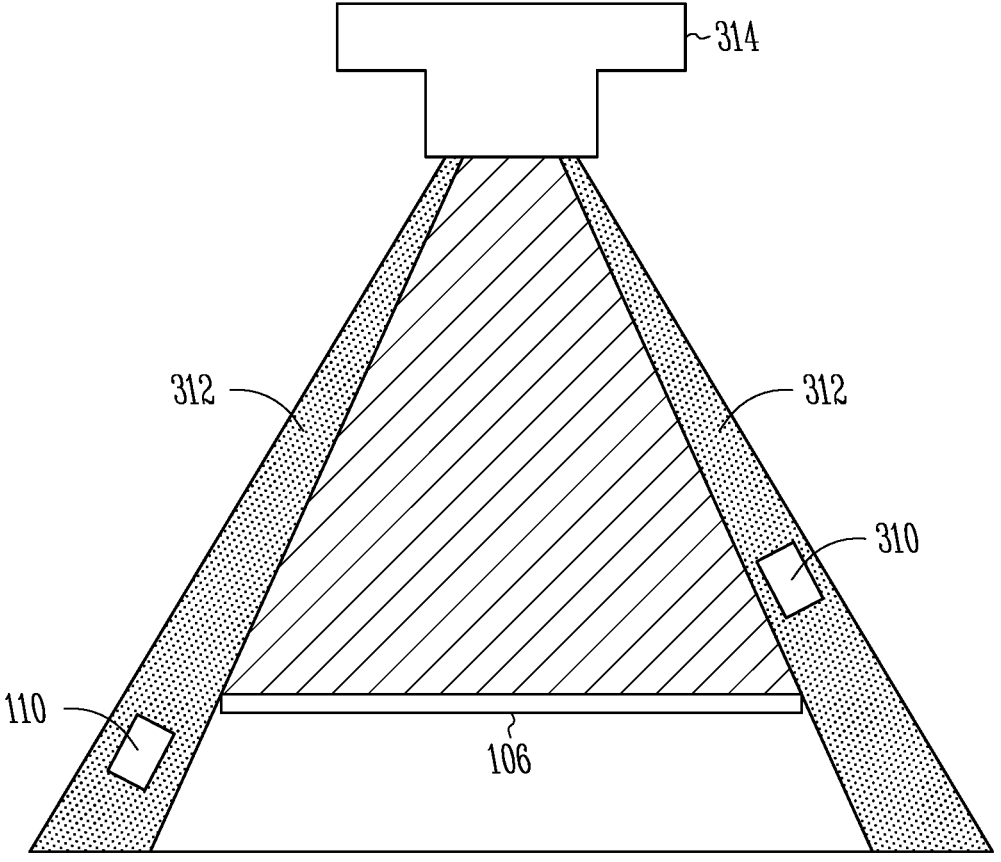
FIG. 3 is a cross-sectional illustration showing the field of view of a laser energy source.

FIG. 3 is a cross-sectional illustration that shows the field of view of the laser. FIG. 3 shows that the laser can be pointed beyond the area of a laser-markable item 106 (e.g., a laser-markable card). The field of view includes a view portion 312 that extends beyond the area of the laser-markable item 106, and the laser-safe start-up target 110 is positioned within the view portion 312. Start-up target 110 is shown farther away from the laser energy source 314 than the laser-markable item 106. The laser is focused so that the focal point of the laser beam is positioned on the surface of the laser-markable item 106 and a high level of power will be located on the surface of the laser-markable item 106. Because the start-up target 110 is located farther away from the laser energy source 314, the surface of the start-up target is out of the focal point of the laser beam, and less energy is incident on the surface of the start-up target 110 than on the surface of the laser-markable item 106.

FIG. 3 also shows another start-up target 310 in an alternate position closer to the laser energy source 314. The laser beam is pointed at start-up target 310 during the start-up phase. Placing the start-up target 310 closer to the laser generating source 314 also locates the start-up target 310 out of the focal point of the laser beam. Placing the start-up target above or below the plane of laser-markable item 106 (e.g., one-half inch or more above or below the plane) exposes the start-up target to a greatly reduced level power and the start-up target (110 or 310) is not likely to be damaged by the laser during use. This permits the use of a wide variety of materials that can be used for the start-up target.

One or more start-up targets may be placed anywhere in the field of view of the laser that doesn't impede the marking of the laser-markable item 106. Typically, a start-up target 110 will be laterally and vertically displaced from the laser-markable item 106, such as by positioning the start-up target 110 in a different plane from the laser-markable item 106. The start-up target can include metal (e.g., sheet metal) having a non-reflective coating.

Figure 4:
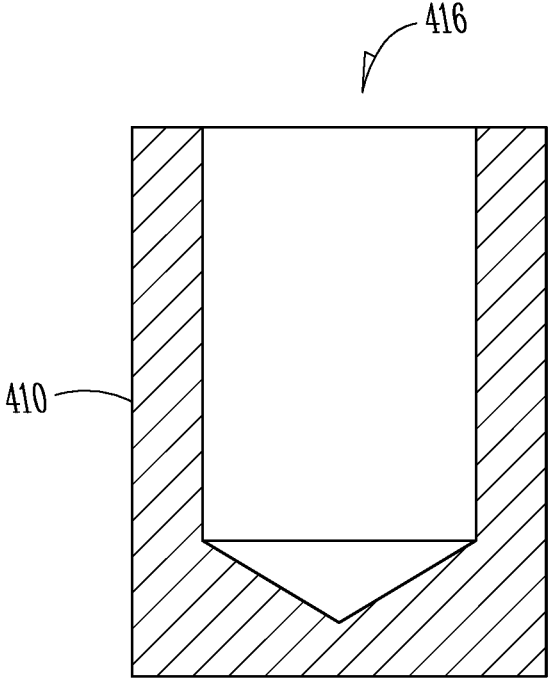
FIG. 4 is an illustration of an example of a laser start-up target.

FIG. 4 is an illustration of another example of a start-up target. The start-up target includes metal having a cavity 416 (e.g., having a cylindrical, cubic, or other shape) and an opening into the cavity 416. The cavity 416 may be formed by drilling. The laser controller 104 points the laser beam into the opening during the start-up phase and the laser energy dissipates within the cavity 416.

Figure 5:
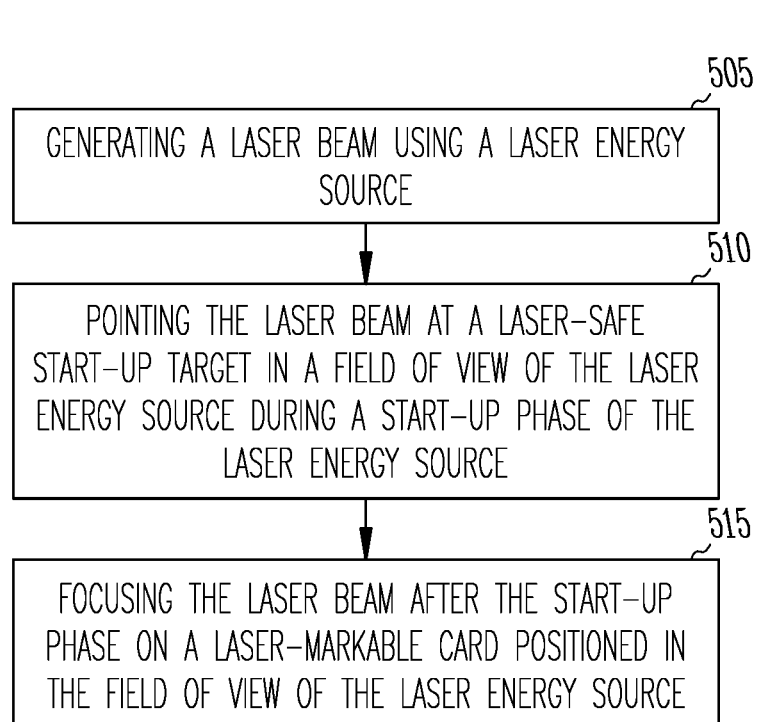
FIG. 5 is a flow diagram of an example of a method of operating a laser-marking system

FIG. 5 is a flow diagram of an example of a method 500 of operating a laser-marking system. The method 500 may be performed using the laser-marking system 100 in the example of FIG. 1. At block 505, a laser beam is generated using a laser energy source. At block 510, the generated laser beam is pointed at a laser-safe start-up target (e.g., start-up target 110 of FIG. 1) in a field of view of the laser energy source during a start-up phase of the laser energy source. The laser beam is pointed and focused using a laser controller (e.g., laser controller 104 of FIG. 1) as described previously herein. At block 515, after the start-up phase, the laser beam is in steady state and is focused on the laser-markable item positioned in the field of view of the laser energy source and marking of the item begins.

The laser-markable items may be cards that are automatically fed into the laser module one at a time using a transport mechanism such as a belt drive mechanism. The belt (e.g., belt 108 in FIG. 1) of the belt drive mechanism positions a card to allow marking of the card. In some examples, the laser controller 104 points the laser beam at the start-up target 110 in between or prior to the marking of each item. This can include the laser controller 104 pointing the laser beam at the start-up target 110 while the card is being positioned for marking. The laser energy source may be in the start-up phase during the positioning. In variations, the start-up phase and the pointing of the laser beam at the start-up target 110 may occur before or after the card is positioned for marking.

The methods systems and devices described herein allow for a start-up phase for a laser engraver to reach steady state before engraving is started. This improves image quality of the first items to be engraved in a batch of the items.

ADDITIONAL DISCLOSURE AND EXAMPLES

Example 1 can include subject matter (such as a laser marking system) comprising a laser energy source configured to generate a laser beam, a laser controller configured to focus the laser beam over a field of view greater than a size of the laser-markable items, and a start-up target that includes laser-safe material and is located within the field of view. The laser controller is further configured to point the laser beam at the start-up target during a start-up phase of the laser energy source and focus the laser beam on one of the laser-markable items after the start-up phase.

In Example 2, the subject matter of Example 1 optionally includes a start-up target positioned within the field of view and closer to the laser energy source than a position of the one of the laser-markable items during laser-marking.

In Example 3, the subject matter of one or both of Examples 1 and 2 optionally includes a start-up target positioned within the field of view and farther from the laser energy source than a position of the one of the laser-markable items during laser-marking.

In Example 4, the subject matter of one or any combination of Examples 1-3 optionally includes a start-up target that includes metal having a non-reflective coating.

In Example 5, the subject matter of one or any combination of Examples 1~4 optionally includes a start-up target that includes metal having an opening.

In Example 6, the subject matter of one or any combination of Examples 1-5 optionally includes a laser controller configured to point the laser beam at the start-up target between marking of each of the laser-markable items.

In Example 7, the subject matter of one or any combination of Examples 1-6 optionally includes a transport mechanism that positions the laser-markable items in the field of view for marking, and a laser controller configured to point the laser beam at the start-up target in the field of view during the start-up phase while the one of the laser-markable items is positioned.

In Example 8, the subject matter of one or any combination of Examples 1-7 optionally includes a transport mechanism that positions the laser-markable item in the field of view for marking, and a laser controller is configured to point the laser beam at the start-up target in the field of view during the start-up phase when the one of the laser-markable items is positioned in the field of view.

In Example 9, the subject matter of one or any combination of Examples 1-8 optionally includes a laser energy source that increases laser energy of the laser beam during the start-up phase.

In Example 10, the subject matter of one or any combination of Examples 1-8 optionally includes a laser energy source that decreases laser energy of the laser beam during the start-up phase.

Example 11 includes subject matter (such as a method of operating a laser marking system) or can optionally be combined with one or any combination of Examples 1-10 to include such subject matter, comprising generating a laser beam using a laser energy source, pointing the laser beam at a laser-safe start-up target in a field of view of the laser energy source during a start-up phase of the laser energy source, and focusing the laser beam after the start-up phase on a laser-markable item positioned in the field of view of the laser energy source.

In Example 12, the subject matter of Example 11 optionally includes a start-up target is located closer to the laser energy source than the laser-markable item.

In Example 13, the subject matter of one or both of Examples 11 and 12 optionally includes a start-up target located farther away from the laser energy source than the laser-markable item.

In Example 14, the subject matter of one or any combination of Examples 11-13 optionally includes marking multiple laser-markable items using the laser beam and pointing the laser beam at the start-up target after marking a laser-markable item.

In Example 15, the subject matter of one or any combination of Examples 11-14 optionally includes positioning the laser-markable item in the field of view for marking using a transport mechanism and pointing the laser beam at the start-up target while positioning the laser-markable item for marking.

In Example 16, the subject matter of one or any combination of Examples 11-15 optionally includes including positioning the laser-markable item in the field of view for marking using a transport mechanism and pointing the laser beam at the start-up target after the laser-markable item is positioned for marking.

In Example 17, the subject matter of one or any combination of Examples 11-16 optionally includes increasing laser energy of the laser beam during the start-up phase.

In Example 18, the subject matter of one or any combination of Examples 11-16 optionally includes decreasing laser energy of the laser beam during the start-up phase.

Example 19 includes subject matter (such as a card marking system) or can optionally be combined with one or any combination of Examples 1-18 to include such subject matter, comprising a laser module, a start-up target, and a transport mechanism. The laser module includes a laser energy source configured to generate a laser beam, and a laser controller configured to focus the laser beam over a field of view defining an engravable area by the laser beam. The start-up target includes laser-safe material and is located within the field of view of the laser. The transport mechanism receives a laser-markable card and positions the card within the field of view. The laser controller is further configured to point the laser beam at the start-up target during a start-up phase of the laser energy source and focus the laser beam on the laser-markable card after the start-up phase.

In Example 20, the subject matter of Example 19 optionally includes a transport mechanism that positions the laser-markable card in a plane within the field of view for marking, and a start-up target positioned above or below the plane of the laser-markable card.

The non-limiting Examples can be combined in any permutation or combination. The above detailed description is intended to be illustrative, and not restrictive. For example, the above-described Examples (or one or more aspects thereof) may be used in combination with each other in any permutation. The detailed description includes references to the accompanying drawings, which form a part of the detailed description. The drawings show, by way of illustration, specific embodiments in which the invention can be practiced. Other embodiments can be used, such as by one of ordinary skill in the art upon reviewing the above description. In the detailed description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the description, with each claim standing on its own as a separate embodiment, and it is contemplated that such embodiments can be combined with each other in various combinations or permutations.

What is claimed is:

1. A laser marking system for marking laser-markable items, the system comprising:
   a laser energy source configured to generate a laser beam;
   a laser controller configured to focus the laser beam over a field of view greater than a size of the laser-markable items; and
   a start-up target that includes laser-safe material that is safe from laser marking and is located within the field of view;
   wherein the laser controller is further configured to:
   point the laser beam at the start-up target during a start-up phase of the laser energy source, wherein energy of the laser beam transitions from an idle state energy to a steady state energy during the start-up phase and the start-up target is positioned away from a focal distance of the laser source used during laser-marking; and
   focus the laser beam on one of the laser-markable items after the start-up phase.

2. The system of claim 1, wherein the start-up target is positioned within the field of view and closer to the laser energy source than a position of the one of the laser-markable items during laser-marking.

3. The system of claim 1, wherein the start-up target includes metal having a non-reflective coating.

4. The system of claim 1, wherein the laser controller is configured to point the laser beam at the start-up target between marking of each of the laser-markable items.

5. The system of claim 1, including:
   a transport mechanism that positions the laser-markable items in the field of view for marking; and
   wherein the laser controller is configured to point the laser beam at the start-up target in the field of view during the start-up phase while the one of the laser-markable items is positioned in the field of view.

6. The system of claim 1, wherein the laser energy source increases laser energy of the laser beam during the start-up phase.

7. A method of operating a laser marking system, the method comprising:
   generating a laser beam using a laser energy source;
   pointing the laser beam at a laser-safe start-up target that is safe from laser marking and is located in a field of view of the laser energy source during a start-up phase of the laser energy source, wherein energy of the laser beam transitions from an idle state energy to a steady state energy during the start-up phase and during the start-up phase the start-up target is positioned away from a focal distance of the laser source used during laser-marking; and
   focusing the laser beam after the start-up phase on a laser-markable item positioned in the field of view of the laser energy source.

8. The method of claim 7, wherein the start-up target is located closer to the laser energy source than the laser-markable item.

9. The method of claim 7, including:
   marking multiple laser-markable items using the laser beam; and
   pointing the laser beam at the start-up target after marking a laser-markable item.

10. The method of claim 7, including positioning the laser-markable item in the field of view for marking using a transport mechanism, and wherein pointing the laser beam includes pointing the laser beam at the start-up target while positioning the laser-markable item for marking.

11. The method of claim 7, including increasing laser energy of the laser beam during the start-up phase.

12. A card marking system, the system comprising:

a laser module including:

a laser energy source configured to generate a laser beam; and a laser controller configured to focus the laser beam over a field of view defining an engravable area by the laser beam;

a start-up target that includes laser-safe material that is safe from laser marking and is located within the field of view; and a transport mechanism to receive a laser-markable card and position the card within the field of view;

wherein the laser controller is further configured to:

point the laser beam at the start-up target during a start-up phase of the laser energy source, wherein energy of the laser beam transitions from an idle state energy to a steady state energy during the start-up phase and during the start-up phase the start-up target is positioned away from a focal distance of the laser source used during laser-marking; and focus the laser beam on the laser-markable card after the start-up phase.

13. The system of claim 12, wherein the transport mechanism positions the laser-markable card in a plane within the field of view for marking, and the start-up target is positioned above or below the plane of the laser-markable card.

14. The system of claim 1, wherein the startup target includes a cavity and a cavity opening; and wherein the laser controller is configured to direct the laser beam into the cavity opening during the start-up phase.

* * * * *